Jan. 25, 1955  D. C. GERBER  2,700,430
SUCTION CLEANER
Filed Sept. 1, 1951  2 Sheets-Sheet 1
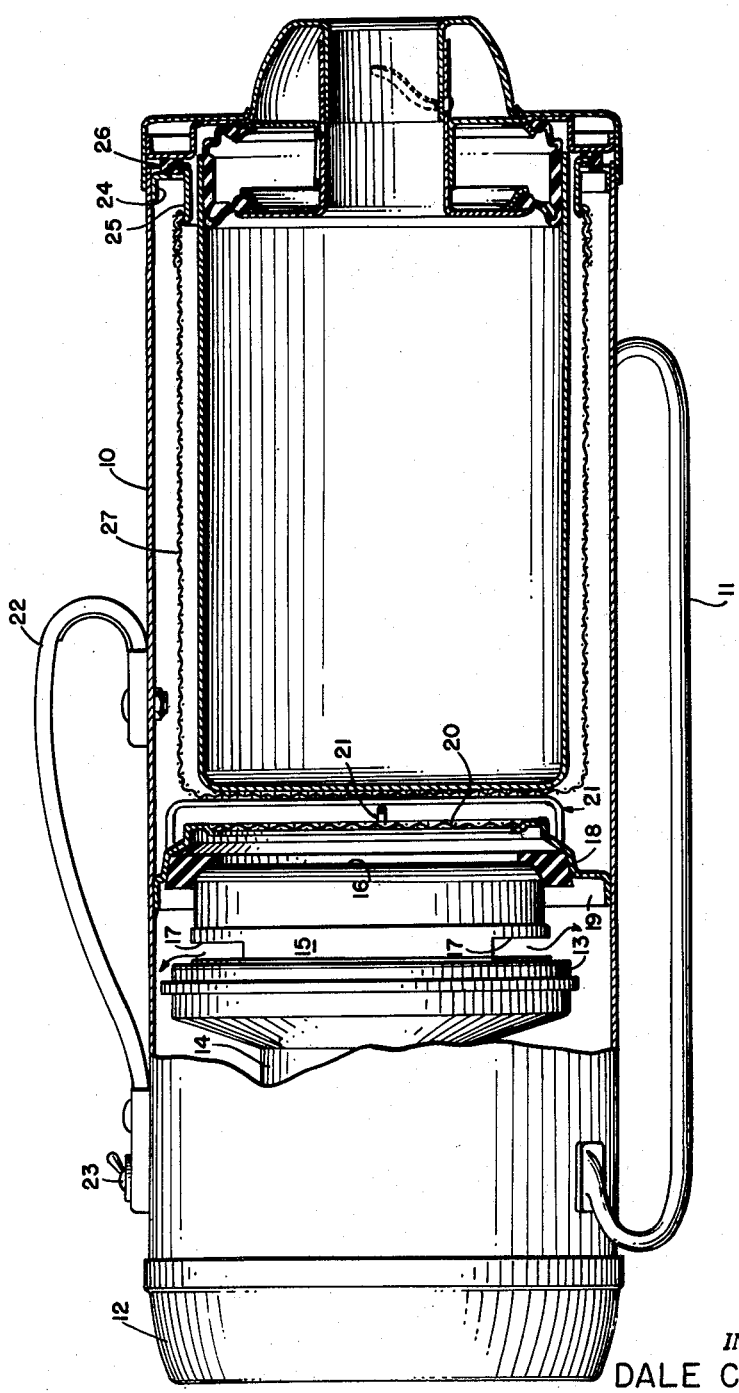
INVENTOR:
DALE C. GERBER
BY
*Harry S. Bucarss*
ATTORNEY Jan. 25, 1955  D. C. GERBER  2,700,430
SUCTION CLEANER
Filed Sept. 1, 1951  2 Sheets-Sheet 2
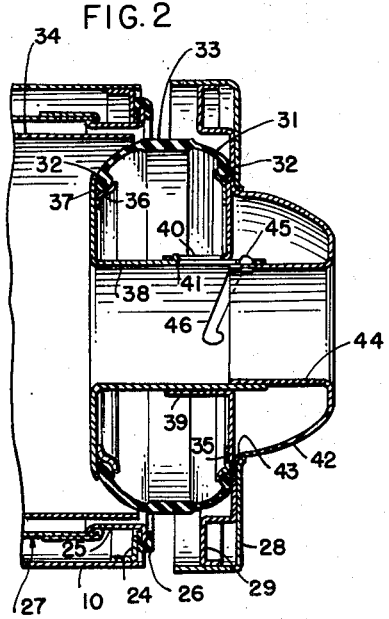
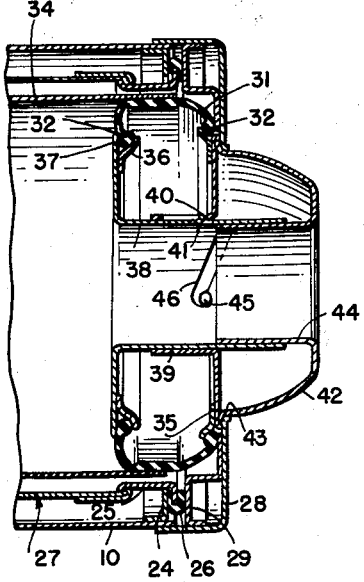
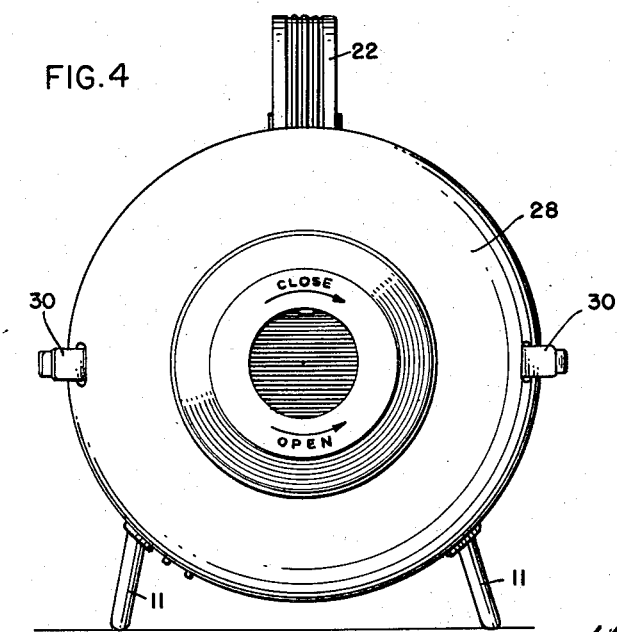
INVENTOR:
DALE C. GERBER
BY
ATTORNEY

United States Patent Office 2,700,430
Patented Jan. 25, 1955

2,700,430

SUCTION CLEANER

Dale C. Gerber, North Canton, Ohio, assignor to The Hoover Company, North Canton, Ohio, a corporation of Ohio Application September 1, 1951, Serial No. 244,749

6 Claims. (Cl. 183—51)

This invention relates to an improved suction cleaner construction and more particularly to a novel arrangement for releasably mounting a filter thereon.

The invention as herein disclosed is embodied in a tank type cleaner, although it will be obvious that the inventive concept and principles are readily adapted for use in the upright or floor type cleaner. The basic problem solved by this invention is a speedy, efficient, inexpensive and easily operated means for sealing the open end of a filter bag to the cleaner casing. The invention is particularly advantageous in connection with grocery sack type paper filters which are especially troublesome to mount in the cleaner unless the filter is equipped with additional and costly stiffening members. Such members are highly undesirable for a filter intended for a single use before being discarded.

This invention proposes the use of a combined filter pilot and expanding clamping device mounted on the closure member for the filter housing. In its normal relaxed condition, the doughnut-like clamping device has a diameter somewhat less than that of the filter inlet and its rounded contour serves as a pilot to guide the filter onto the clamp. Thereafter a simple manual operation performed exteriorly of the casing expands the resilient clamping device into gripping and air tight sealing engagement with the filter. When the clamp is manually released, the closure is readily removed so that the open filter bag can be lifted from its housing in the cleaner and replaced with a fresh bag.

Accordingly, it is an object of the invention to provide a suction cleaner with a new and improved filter assembly.

Another object is the provision of a simplified and highly efficient expanding clamp for use with suction cleaner filter bags.

Yet another object is the provision of a combined expanding filter clamp and filter pilot in combination with the end cap for the filter housing.

Numerous other objects and advantages of the invention will become apparent from the following detailed specification taken in connection with the accompanying drawings, in which:

Figure 1 is a side of a tank cleaner with parts broken away to show details of the invention;

Figure 2 is a vertical sectional view through the filtering, mounting and clamping means as the end cap is being put in place on or withdrawn from the filter housing;

Figure 3 is a view similar to Figure 2, but with the closure in place and the clamp in expanded, filter mounting position; and Figure 4 is an end of Figure 3 showing the assembled cleaner.

The suction cleaner in which the invention is here shown as incorporated includes a cylindrical casing 10 open at its opposite ends and supported by a pair of runners 11. The discharge end of the casing is closed by an end cap 12 having an air discharge opening, not shown, in its central end portion. A motor-fan unit generally indicated at 13 is mounted at the left hand end of the casing and includes the usual electric motor 14 directly coupled to the rotating elements of a multiple stage fan 15 having an eye or inlet opening 16 centrally of its right hand end. The air exhausts from the fan through a series of openings 17 in the rearward portion of its casing, or, if desired, the air may pass axially through the motor to cool it. The inlet end of fan 15 is nested in a soft rubber bushing 18 which in turn is seated in a supporting bulkhead 19 riveted or otherwise secured to casing 10. A protective screen 20 extends across the fan eye and prevents foreign material from entering the fan. A pair of U-shaped wire guard members 21, located at right angles to one another, straddle guard screen 20 and serve to support the bottom of the filter bag so as to provide space for the free flow of air to the fan inlet.

A carrying handle 22 is mounted on the top side of the cleaner casing and includes a toggle switch 23 for controlling the operation of motor 14 in the customary manner.

By far the greater portion of casing 10 serves as a housing or enclosure for the dirt filter bag and the mounting means therefor. As will be readily apparent from Figure 1, the filter mounting means comprises a flanged ring member 24 mounted just inside the end of casing 10. The inturned flange of this ring provides a seat for a ring member 25 having an out-turned end enclosed by a rubber gasket ring 26. The opposite end of ring 25 projects into the filter housing and has the inlet end of a cloth filter bag 27 permanently secured thereto. The filter bag 27 is of the usual type having a cylindrical side wall and a circular bottom positioned to rest against guard wires 21, 21. This filter is readily removable from the casing and by lifting ring 25 outwardly through the inlet end of the casing.

The closure for the inlet end of casing 10 will be best understood by reference to Figure 2 wherein it will be observed to comprise a cup-shaped outer member 28 within which is mounted a channelled ring 29 having an inner face positioned to seat firmly against the outer surface of gasket 26 and hold it tightly against ring member 24 on casing 10. It will therefore be understood that the end cap telescopes over the end of the casing and may be held thereon by a pair of the usual toggle clamps 30, 30 mounted on the opposite sides of the cleaner casing.

A second filter clamping mechanism for a disposable paper filter is mounted on the inner side of end cap 28. In its general configuration this clamp has the appearance of a doughnut. The active part of the clamp comprises a resilient moulded rubber semi-spherical member 31. The side rim portions of this member 32, 32 are circular in cross-section and are formed integrally with the body of the clamping ring. The central, cylindrical portion 33 of the clamping ring is thicker than the walls to either side. As will be noted from Figure 2, the diameter of cylindrical portion 33 in its normal relaxed condition is somewhat less than the diameter of the inlet to paper filter bag 34. It will also be observed that the diameter of filter 34 is somewhat less than the interior diameter of the cloth filter mounting ring 25.

One ring 32 of the clamping device is secured to the inner wall of closure 28 by a clamping ring 35, while the other ring is rigidly supported between two clamping members 36 and 37. Member 37 is formed as a flange on a tubular member 38 which projects outwardly through a collar 39 carried by channelled member 29. Collar 39 is provided with a slot 40 in which a tab 41 struck upwardly from tubular member 38 projects. Thus, it will be apparent that member 38 can slide axially through collar 39 but is retained against relative rotation by tab 41 and slot 40.

Control means for expanding clamping member 31 comprises a stamped sheet metal collar 42 having a flanged rim 43 operating in a circular groove formed between closure member 28 and member 29, as clearly illustrated in Figure 2. Collar 42 includes a tube 44 which telescopes into tubular member 38. A stop 45 projects from the outer wall of tube 44 and operates in a cam shaped slot 46 formed in tube 38. Thus, as collar 42 is rotated clockwise, stop 45 rotates through slot 46 in tube 38 and causes members 37 and 38 to be moved axially toward the closure member to the position shown in Figure 3. As this operation takes place, rings 32, 32 of clamping member 31 are moved toward one another. Since these ring members are restrained against inward radial movement, stresses are set up within the walls of the resilient member which are effective to expand cylindrical wall 33 outwardly into firm gripping relation with the inner wall of paper filter 34. In this manner the clamping ring forms an airtight mounting seal for the paper filter bag. The bag is released simply by turning collar 42 counterclockwise allowing the clamping ring 31 to return to its relaxed position in which wall 33 contracts to its normal diameter which is somewhat less than that of the paper filter.

Operation

Let it be assumed that the operator wishes to assemble a paper filter bag within the cleaner. To do so the operator upends the cleaner onto end cap 12 as a supporting base. She then unclamps toggle clamps 30 permitting end cap 28 to be removed. A paper filter bag is then unfolded and inserted downwardly through the open end of the casing so that its bottom is supported by the bottom of the cloth filter. The open upper end of the paper filter will then be flush with the open end of casing 10.

The end cap is next placed over the end of the casing. As will be readily apparent, the rounded inner end of clamping member 31 acts as a pilot to guide the placement of the end cap over the cleaner as it enters and progressively expands the walls of the paper filter outwardly. Due to the difference in diameters of member 31 and the filter inlet, this operation takes place very easily and without danger of displacing the paper filter or collapsing it inwardly into the cleaner.

As soon as the end cap is seated, the operator rotates collar 42 clockwise causing members 37 and 38 to be telescoped toward the end cap thereby causing cylindrical wall 33 to be expanded firmly against the inlet of the filter. Toggle clamps 30 may then be closed to clamp the cap against gasket 26.

The cleaner is now ready for use and the only remaining operation is to couple the usual flexible hose into tubular member 44 so that the dirt laden air flows into the filter bag. The dirt separates out in the paper filter and the clean air flows through the walls and through the cloth filter if one is in use on the cleaner. The air then enters the eye 16 of the fan and discharges through outlet 17 and out of the casing through the outlet opening in end cap 12.

After the paper filter has become filled, the operator upends the cleaner on cap 12 and unlatches clamps 30 to release end cap 28. If the operator prefers, the end cap together with the attached paper filter may then be lifted from the cleaner as a unitary sub-assembly and carried to a point of dirt disposal. The filter is then detached by rotating collar 42 counterclockwise allowing clamping member 31 to collapse and release the paper filter. A fresh filter may be inserted over the combined pilot and clamping device and locked thereon by rotating collar 42 clockwise while the end cap is removed from the cleaner. Or if the operator prefers, the new paper filter may be inserted into the cloth filter after which closure 28 is inserted thereinto and clamped to the paper filter as described in detail above.

In practice, it has been found that some users of the present invention prefer to assemble the paper filter on the end cap before placing the assembly in the cleaner casing while others prefer to place the fresh filter within the casing and then insert the end cap before operating the clamping ring. As will be readily understood from the foregoing, it is a matter of choice with the operator which assembly procedure is followed. It will also be manifest that the cleaner may be used without the paper filter if new ones are not at hand. In this event, the operator merely puts the closure cap 28 in place and clamps it by closing toggles 30. This operation seals the cloth filter between ring 24 and channel member 29 on the end cap. It is therefore immaterial whether clamping ring 31 is left in its normal relaxed position or closed by expanding it as though a paper filter were in place. It is also quite feasible to use the cleaner with the paper filter alone merely by detaching cloth filter 27 from mounting ring 25.

While I have shown but a single modification of my invention it is to be understood that this modification is to be taken as illustrative only and not in a limiting sense. I do not wish to be limited to the particular structure shown and described but to include all equivalent variations thereof except as limited by the scope of the claims.

I claim:

1. In combination with a suction cleaner chamber having a large area opening, a filter bag in said chamber having a large diameter mouth lying substantially flush with said chamber opening, a cover for said casing opening, an expandable filter clamp on the inner wall of said cover adapted to telescope readily into the filter bag mouth when in its normal relaxed condition and to be expanded against the inner wall of the filter mouth to form an air tight seal therewith, said clamp comprising an annular thin-walled resilient member having a large diameter section and an inner end section of gradually decreasing diameter to form a pilot for centering the mouth of the filter and guiding the same onto said large diameter section, means for securing the opposite ends of said clamp to said cover including means for moving said ends toward one another when a filter is in place on said clamp whereby said large diameter section is expanded to grip the mouth of the filter in an air-tight manner.

2. An end cap for the filter chamber of a suction cleaner comprising a cover having a relatively small diameter air stream inlet opening therethrough, a filter bag pilot and clamping device on the inner side of said cover surrounding said inlet opening and of considerably greater diameter, said device including a resilient, thin-walled annular member pre-formed with a circumferentially extending bulge intermediate the ends thereof, means supporting the opposite ends of said annular member spaced radially away from said air stream opening, the inner end portion of said annular member being rounded and of decreasing diameter toward the outer edge thereof to form a pilot for guiding the same into the mouth of a filter bag, and means for moving said outer edge of annular member axially toward said cover to expand said bulged portion outwardly to provide an air-tight connection with the mouth of a filter bag when the latter is telescoped into place over said annular member.

3. In combination, a filter chamber for a suction cleaner having a large area inlet opening, a tubular paper filter bag in said chamber having a closed end positioned remotely from said inlet opening and an open end of substantially the same area as the body portion of the bag positioned adjacent the plane of said inlet opening, a closure member for said filter chamber inlet opening having an air inlet passage therethrough opening into said filter bag, a combined filter clamp and pilot secured to the inner side of said closure member comprising a thin walled resilient annular member encircling said air inlet passage and having a maximum normal diameter somewhat less than the diameter of the open end of said filter bag so as to be freely and readily insertable into the open end of said filter as said closure member is closed, the innermost rim of said annular member being rounded to provide a pilot of gradually increasing diameter for guiding said clamping member into said filter and for opening the open end thereof as the closure member is closed, and means for expanding the walls of said annular member against the inner rim edges of the open end of said filter to form an airtight seal therewith.

4. In combination, an open ended filter chamber for a suction cleaner, a paper filter bag within said chamber having a tubular body closed at its inner end and fully open at its outer end, said open outer end being positioned closely adjacent the plane of the open end of said chamber and having a diameter less than the diameter of said chamber, a closure member for the open end of said chamber having an outer wall engageable with the rim of said open end and an inner wall spaced inwardly thereof and generally parallel thereto, a pair of relatively movable telescoping tubes interconnecting said inner and outer walls and forming an air inlet passage to said filter through said closure, a resilient filter clamping ring closing the space between said inner and outer walls opposite the rim of said inner wall, said clamping ring having a large diameter mid-section and a rounded inner end joined to the rim of the inner wall and cooperating therewith to provide a resilient pilot for guiding said clamping ring into the open end of said filter as said closure member is closed and means for moving said inner wall toward said outer wall to move the ends of said clamping ring axially toward one another to expand said clamping ring into firm sealing engagement with the inner rim of the open end of said filter.

5. In combination, a suction cleaner having a cylindrical casing housing a motor-fan unit in one end thereof and forming an open ended filter chamber at its opposite end, a paper filter bag in said filter chamber having a tubular body closed at its inner end and having an unrestricted open end lying closely adjacent the open end of said filter chamber, an end cap normally closed across the open end of said chamber and having an outer wall and an inner wall spaced inwardly of the open end of said filter and of substantially smaller area than said open end, a filter clamping ring of resilient flexible material having one end edge secured to the rim of said inner wall and its other end edge secured to the outer wall of said end cap, said ring having an outwardly bulging midsection extending circumferentially thereof having a normal diameter slightly less than the diameter of the open end of said filter, the inner end of said ring curving inwardly toward the axis of said ring to provide a rounded pilot to guide the open end of the filter onto said bulging mid-section as said ring is telescoped into said filter, means for conducting an air stream into said filter bag through said end cap, and means for moving the opposite ends of said outwardly bulging clamping ring toward one another to expand the diameter of said mid-section until it seals against the inner rim of the open end of said filter without rupturing the wall of said filter.

6. In combination, an open ended filter chamber for a suction cleaner having an inwardly flanged ring supported across the open end thereof, a paper filter bag in said chamber having a cylindrical body closed at its inner end and having a non-reinforced open end terminating opposite said flanged ring, the open end of said filter being of smaller diameter than said flanged ring so as to be freely insertable into said chamber without interference from said ring, an end cap normally closing the open end of said filter chamber and having an expandable filter clamping ring on the inner side thereof shaped to telescope into the open end of said filter bag while the same is assembled in its normal operating position in said filter chamber as said end cap is closed and to be expanded against the inner rim of said filter to form an airtight joint therewith, said clamping ring comprising a ring of flexible resilient material having an outwardly bulging mid-section having a normal diameter slightly less than the diameter of the open end of said filter, the inner end of said ring being rounded inwardly toward the axis of said ring along a radius providing a pilot surface of gradually increasing diameter for guiding the non-reinforced rim of said filter bag onto said clamping ring as said end cap is closed, means operable from the exterior of said end cap for expanding said resilient ring into sealing contact with the rim of said filter and means for conducting dirt laden air through said end cap and into said filter bag.

References Cited in the file of this patent

UNITED STATES PATENTS

| | | |
|---|---|---|
| 1,099,158 | Baker | June 9, 1914 |
| 1,524,296 | Field | Jan. 27, 1925 |
| 1,861,402 | Van Riper | May 31, 1932 |
| 1,919,001 | White | July 18, 1933 |
| 2,237,499 | Osterdahl | Apr. 8, 1941 |
| 2,537,205 | Burmeister | Jan. 9, 1951 |
| 2,580,644 | Lofgren | Jan. 1, 1952 |
| 2,627,361 | Zerbe | Feb. 3, 1953 |

FOREIGN PATENTS

| | | |
|---|---|---|
| 387,245 | Great Britain | Feb. 2, 1933 |